(12) United States Patent
Perry

(10) Patent No.: US 8,138,237 B2
(45) Date of Patent: Mar. 20, 2012

(54) ANTI-SLIP DETERGENT

(76) Inventor: Stephen C. Perry, Norwood, MA (US)

( * ) Notice: Subject to any disclaimer, the term of this patent is extended or adjusted under 35 U.S.C. 154(b) by 175 days.

(21) Appl. No.: 12/353,451

(22) Filed: Jan. 14, 2009

(65) Prior Publication Data
US 2010/0179246 A1 Jul. 15, 2010

(51) Int. Cl.
*C08J 5/14* (2006.01)
*C11D 17/08* (2006.01)

(52) U.S. Cl. ........ 523/149; 510/405; 510/417; 510/421; 510/437

(58) Field of Classification Search .......... 523/149; 510/405, 417, 421, 437
See application file for complete search history.

(56) References Cited

U.S. PATENT DOCUMENTS

| | | | |
|---|---|---|---|
| 3,691,140 A | 9/1972 | Silver | |
| 3,793,275 A * | 2/1974 | Corey et al. | 524/340 |
| 3,839,234 A * | 10/1974 | Roscoe | 510/435 |
| 3,912,673 A * | 10/1975 | Force | 524/96 |
| 4,376,175 A * | 3/1983 | Posten | 523/501 |
| 4,594,111 A * | 6/1986 | Coonan | 134/3 |
| 4,749,508 A * | 6/1988 | Cockrell et al. | 510/201 |
| 5,929,024 A * | 7/1999 | Stringer et al. | 510/504 |
| 5,973,045 A * | 10/1999 | Dowling et al. | 524/270 |
| 2005/0222322 A1* | 10/2005 | Koketsu et al. | 524/556 |
| 2007/0054832 A1* | 3/2007 | Hocking et al. | 510/475 |

* cited by examiner

*Primary Examiner* — Mark Eashoo
*Assistant Examiner* — David Karst
(74) *Attorney, Agent, or Firm* — James David Johnson, P.A.; James David Johnson

(57) ABSTRACT

A composition and method for making a composition that increases friction between a first surface and a second surface while also cleaning the first surface. The composition is an anti-slip detergent that can assist in preventing slip-and-fall accidents on wet floors that have recently been mopped. The composition includes a synthetic dimerized thermoplastic resin, a surfactant, tall oil distillate, (2-methoxymethyl-ethoxy)-propanol, 2,2',2''-trihydroxy-triethylamine, and water. The composition may also include an acrylate copolymer to further enhance its friction-producing properties.

10 Claims, 1 Drawing Sheet

Table 1. Coefficients of Friction After Applying Diluted Composition to Surfaces.

| Coefficient of Friction Before and After Application of Composition to Dry and Wet Surfaces | | | | |
|---|---|---|---|---|
| Surface | Before -Dry | After - Dry | Before - Wet | After - Wet |
| Waxed Floor | 0.53 | 0.72 | 0.44 | 0.52 |
| Unwaxed Linoleum | 0.61 | 0.74 | 0.35 | 0.51 |
| Granite, Polished | 0.41 | 0.71 | 0.30 | 0.52 |
| Concrete, Polished to 800 grit | 0.51 | 0.79 | 0.62 | 0.66 |
| Concrete, Polished to 1,200 grit | 0.44 | 0.73 | 0.52 | 0.59 |

Table 1. Coefficients of Friction After Applying Diluted Composition to Surfaces.

| Coefficient of Friction Before and After Application of Composition to Dry and Wet Surfaces | | | | |
|---|---|---|---|---|
| Surface | Before - Dry | After - Dry | Before - Wet | After - Wet |
| Waxed Floor | 0.53 | 0.72 | 0.44 | 0.52 |
| Unwaxed Linoleum | 0.61 | 0.74 | 0.35 | 0.51 |
| Granite, Polished | 0.41 | 0.71 | 0.30 | 0.52 |
| Concrete, Polished to 800 grit | 0.51 | 0.79 | 0.62 | 0.66 |
| Concrete, Polished to 1,200 grit | 0.44 | 0.73 | 0.52 | 0.59 |

FIG. 1

ANTI-SLIP DETERGENT

FIELD OF THE INVENTION

The invention relates to methods and compositions for increasing friction between a first surface and a second surface while the first surface is being cleaned. More particularly, the invention relates to methods and compositions for using a detergent having anti-slip properties to clean the first surface so that the second surface experiences a higher degree of friction with the first surface, thereby preventing slipping or sliding of the second surface at its interface with the first surface.

BACKGROUND

Slip-and-fall accidents commonly occur in areas having wet floor surfaces where the floors have been recently mopped or otherwise cleaned. In addition to the effect of water being present on a recently cleaned floor surface, detergents and other cleaning or polishing agents also decrease the coefficient of friction of the interface between the floor surface and an object contacting the floor surface such as, for example, a shoe of a person walking across the floor. The decreased coefficient of friction corresponds with a reduction in friction between the floor surface and objects contacting that surface as well as an increase in slipperiness of the floor surface. Conventional floor cleaning preparations are disadvantageous for this reason and often create a safety hazard to individuals walking across a recently cleaned floor.

Conventional cleaning preparations also present a disadvantage in that many are unsafe for use on floors polished with a floor finish. These conventional cleaning preparations may be corrosive and may damage a finished floor surface by removing the finish that was used to polish the floor. Conventional cleaning preparations are also problematic because most must be rinsed to prevent the accumulation of a chemical film that deposits onto the surface being cleaned.

A need exists for a cleaning preparation, and particularly a floor-cleaning preparation, that increases the coefficient of friction and slip resistance between a surface being cleaned and an object contacting that surface, thereby decreasing the slipperiness of the surface being cleaned. A need also exists for a cleaning preparation that does not damage finished floors by removing the finish from the floor surface or otherwise negatively affecting the floor's appearance. Still a further need exists for a cleaning and polishing preparation that evaporates without depositing chemical film that can accumulate on the surface being cleaned and which does not require rinsing to remove after application.

SUMMARY

The present invention relates to a detergent composition having anti-slip, friction-increasing properties to clean floors and other surfaces thereby reducing skidding, sliding, and slipping of an object (second surface) in contact with the wet, recently cleaned surface (first surface). The composition may include a synthetic dimerized thermoplastic resin, a surfactant, tall oil distillate, (2-methoxymethylethoxy)-propanol, 2,2',2"-trihydroxy-triethylamine, and water. In an exemplary embodiment, the synthetic dimerized thermoplastic resin is pentaerythritol ester of maleic anhydride rosin and the surfactant is ethoxylated alkyl phenol. In another embodiment, the composition may also include an acrylate copolymer to further enhance its friction-producing properties.

To clean a floor or other surface, the anti-slip detergent may be mixed with water and spread across the surface to be cleaned using a conventional mop or other cleaning article or equipment. The composition forms a "sacrificial" layer of spherical micelles that encapsulate some water. This layer of micelles formed from the composition are not visible to the naked eye. As the micelles age, the aromatic outer layer of the micelle evaporates along with the moisture encapsulated within the micelle. As the micelle evaporates, the spherical shape of each micelle becomes irregular in shape and size, which increases the coefficient of friction of the surface onto which the composition was applied. Over the course of several days, the micelles continue to collapse until they eventually evaporate entirely. Because the composition evaporates entirely several days after application to a floor surface, the composition does not form an accumulation of chemical film deposited on the floor surface. The detergent properties of the composition serve to clean and remove dirt and other grime from the second surface, while the anti-slip properties of the composition render the composition safer for use by reducing or eliminating the formation of slippery surfaces where accidents might occur. To enhance the anti-slip properties and to extend the life of the composition after use, the composition can be applied to the floor surface using a conventional floor buffer such as, for example, a medium- to high-speed buffer.

An advantage of the compositions and methods of this invention is that they increase the dynamic coefficient of friction, traction level and slip resistance of both wet and dry surfaces, thereby decreasing the slipperiness of the surfaces to reduce slip-and-fall and other types of accidents.

Another advantage of the compositions and methods of this invention is that they can be used to clean and polish a floor without the corrosive effects of many conventional floor cleaning preparations which can damage the finish of a finished floor.

Still another advantage of the compositions and methods of this invention is that their usage does not produce a chemical film that accumulates on the surface being cleaned.

Yet another advantage of the compositions and methods of this invention is that the composition evaporates entirely from the cleaned surface a few days after application and does not require an additional step of rinsing the cleaned surface to prevent the accumulation of a chemical film on the cleaned surface.

A further advantage of the compositions and methods of this invention is that they can be used to clean, polish, and protect many types of surface materials using conventional cleaning tools such as a mop or automatic scrubber.

Still another advantage of the compositions and methods of this invention are that they can be used with a conventional floor buffer to add a polished appearance to both previously polished as well as unpolished floors.

Accordingly, the invention features a composition for increasing friction between a first surface and a second surface and for cleaning the first surface. The composition contains a synthetic dimerized thermoplastic resin, a surfactant, tall oil distillate, (2-methoxymethylethoxy)-propanol, 2,2',2"-trihydroxy-triethylamine, and water.

In another aspect, the invention features an acrylate copolymer as an additional ingredient of the composition.

In another aspect, the invention features the composition containing pentaerythritol ester of maleic anhydride rosin as the synthetic dimerized thermoplastic resin.

In another aspect, the invention features the composition containing ethoxylated alkyl phenol as the surfactant.

In another aspect, the invention features the composition containing synthetic dimerized thermoplastic resin in an amount of about 5-12 percent by weight, surfactant in an amount of about 1-6 percent by weight, tall oil distillate in an amount of about 1-8 percent by weight, (2-methoxymethylethoxy)-propanol in an amount of about 12-25 percent by weight, 2,2',2"-trihydroxy-triethylamine in an amount of about 2-9 percent by weight, and water in an amount of about 50-75 percent by weight.

In another aspect the invention features the composition containing acrylate copolymer in an amount of about 0.1-3 percent by weight.

In another aspect, the invention features the composition being produced in the form of a liquid, a liquid concentrate, a gel, an aerosol, or a paste.

In another aspect, the invention features the acrylate copolymer, which is created from at least one alkyl acrylate ester and at least one monomer. The monomer can be one or more ionic monomers, maleic anhydride, or a mixture of at least one ionic monomer and maleic anhydride.

In another aspect, the invention features the composition including at least one alkyl acrylate ester having at least one monomer. The monomer can be 2-methylbutyl acrylate, 4-methyl-2-pentyl acrylate, iso-octyl acrylate, or sec-butyl acrylate.

In another aspect the invention features the composition being a concentrate that is dilutable in water.

In another aspect, the invention features about 3 ounces of concentrate being mixed per one gallon of water.

A method of the invention can be used to prepare a cleaning composition, the method comprising the steps of: (a) mixing together: a synthetic dimerized thermoplastic resin, a surfactant, tall oil distillate, (2-methoxymethylethoxy)-propanol, 2,2',2"-trihydroxy-triethylamine, and water; (b) heating the mixture under a vacuum pressure; and (c) cooling a composition produced by steps (a) and (b).

Another method of the invention includes the step of performing step (a) above during a period of about 1.4-6.5 hours.

Another method of the invention includes the step of performing step (b) above during a period of about 0.5-2.5 hours.

Another method of the invention includes the step of applying pressure to the composition under vacuum in step (b) of the method in a range of about 15-25 inches of mercury.

Another method of the invention includes the step of heating the composition during the heat treatment in steps (a) and (b) of the method in a range of about 140 to 335 degrees Celsius.

Another method of the invention includes the step of mixing an acrylate copolymer into the composition.

Another method of the invention can be used for cleaning and increasing the friction of a surface. The method includes the steps of: (a) producing a composition comprising: a synthetic dimerized thermoplastic resin, a surfactant, tall oil distillate, (2-methoxymethylethoxy)-propanol, 2,2',2"-trihydroxy-triethylamine, and water; and (b) applying the composition to the surface using a cleaning tool such as, for example, a damp mop, an automatic or mechanical scrubber, or any other suitable cleaning device.

Another method of the invention includes the step of applying the composition to the surface when the surface is wet.

Another method of the invention includes the step of applying the composition to the surface when the surface is dry.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 1 is a table showing test results for five tests conducted using the composition.

DETAILED DESCRIPTION

The invention provides a composition for maintaining friction between a first surface and a second surface and for cleaning the first surface. The first surface can be a floor, countertop, or any other solid surface. The second surface can be a shoe, user's foot, or any other object that contacts the first surface. The composition can be a cleaner used to clean and polish floors and other surfaces. More particularly, the composition may include a detergent having anti-slip properties, which can be useful for preventing slip-and-fall accidents on wet floors that have been recently cleaned. The composition may be water-soluble and can be produced as a concentrate that is mixed with and diluted by water before application to a surface. The composition may include a synthetic dimerized thermoplastic resin, a surfactant, tall oil distillate, (2-methoxymethylethoxy)-propanol, 2,2',2"-trihydroxy-triethylamine, and water.

In an exemplary embodiment, the synthetic dimerized thermoplastic resin can be pentaerythritol ester of maleic anhydride rosin and may be included in the composition in an amount of 8 percent by weight. The synthetic dimerized thermoplastic resin preferably has a high softening point and a low acid number. In other embodiments, the composition can include the synthetic dimerized thermoplastic resin in a range of about 7.9-8.1, about 7.5-8.5, about 7-10, or about 5-12 percent by weight.

In an exemplary embodiment, the surfactant can be ethoxylated alkyl phenol and may be included in the composition in an amount of 2 percent by weight. In other embodiments, the composition can include the surfactant in a range of about 1.9-2.1, about 1.5-2.5, about 1-3, about 1.5-5, or about 1-6 percent by weight.

In an exemplary embodiment, the composition can contain tall oil distillate in an amount of 3 percent by weight. The tall oil distillate contains fatty acid and preferably 40 percent resin although other suitable amounts of resin are also contemplated. In other embodiments, the composition can include the tall oil distillate in a range of about 2.9-3.1, about 2.5-3.5, about 2-5, or about 1-8 percent by weight.

In an exemplary embodiment, the composition can contain (2-methoxymethylethoxy)-propanol in an amount of 17 percent by weight. This ingredient of the composition acts as a solvent and as a homogenizing (or coupling) agent. As a cleaning agent, the (2-methoxymethylethoxy)-propanol acts to clean and remove oil-based matter from surfaces. In other embodiments, the composition can include the (2-methoxymethylethoxy)-propanol in a range of about 16.9-17.1, about 16.5-17.5, about 16-18, about 15-20, or about 12-25 percent by weight.

In an exemplary embodiment, the composition can contain 2,2',2"-trihydroxy-triethylamine in an amount of 5 percent by weight. This ingredient serves as an alkaline detergent and soap agent to provide the cleaning action of the composition. The 2,2',2"-trihydroxy-triethylamine also acts as an emulsifier for other ingredients of the composition and as a corrosion inhibitor to prevent corrosion of metallic surfaces exposed to water during cleaning. In other embodiments, the composition can include the 2,2',2"-trihydroxy-triethylamine in a range of about 4.9-5.1, about 4.5-5.5, about 4-6, about 3-7, or about 2-9 percent by weight.

In an exemplary embodiment, water can be included in the composition in an amount of 65 percent by weight. The water acts as a solvent for the other ingredients. In other embodiments, the composition can include water in a range of about 64.9-65.1, about 64.5-65.5, about 64-66, about 61-69, about 58-68, about 53-72, or about 50-75 percent by weight.

In another embodiment the composition can be produced as a superconcentrate in which the ingredients are included in the following percentages by weight: a synthetic dimerized thermoplastic resin, 16 percent; a surfactant, 4 percent; tall oil distillate, 6 percent; (2-methoxymethylethoxy)-propanol, 34 percent; 2,2',2"-trihydroxy-triethylamine, 10 percent; and water, 30 percent.

Several tests (e.g., Tests 1-5 in FIG. 1) have been conducted to determine the effectiveness of the composition in reducing the coefficient of friction on a floor surface cleaned with the composition. In each test, the composition included the following ingredients in the stated percentages: 8 percent by weight pentaerythritol ester of maleic anhydride rosin, 2 percent by weight ethoxylated alkyl phenol, 3 percent by weight tall oil distillate, 17 percent by weight (2-methoxymethylethoxy)-propanol, 5 percent by weight 2,2',2"-trihydroxy-triethylamine, and 65 percent by weight water. These ingredients of the composition form a concentrate that was used in diluted form by mixing 3 ounces of concentrate per one gallon of water. The tests were conducted by applying the composition to both wet and dry surfaces. A BOT-3000 Digital Tribometer distributed by Regan Scientific Instruments of Southlake, Tex. was used to calculate the dynamic coefficient of friction in these tests in which a variety of sensor test materials, including rubber, were used to replicate a person walking across the floor surface materials.

In Test 1, a floor surface waxed using a finish manufactured by Amano Pioneer Eclipse Corporation of Sparta, N.C., was cleaned with a mixture of the composition and water. On a dry waxed floor, the coefficient of friction (COF) increased from 0.53 to 0.72 after application of the diluted composition to the floor surface. On a wet waxed floor, the COF increased from 0.44 to 0.52 after application of the diluted composition to the floor surface. Friction between the waxed floor surface and objects placed on that floor surface was increased resulting in a reduction in the slipperiness of the floor surface.

In Test 2, an unwaxed linoleum floor surface was cleaned using a mixture of the composition diluted in water. On a dry unwaxed linoleum floor, the COF increased from 0.61 to 0.74 after application of the diluted composition to the floor surface. On a wet unwaxed linoleum floor, the COF increased from 0.35 to 0.51 after application of the diluted composition to the floor surface. Friction between the unwaxed linoleum floor surface and objects placed on that floor surface was increased resulting in a reduction in the slipperiness of the floor surface.

In Test 3, a mixture of the composition diluted in water was used to clean a polished granite surface. On a dry polished granite floor, the COF increased from 0.41 to 0.71 after application of the diluted composition to the floor surface. On a wet polished granite linoleum floor, the COF increased from 0.30 to 0.52 after application of the diluted composition to the floor surface. Friction between the polished granite floor surface and objects placed on that floor surface was increased resulting in a reduction in the slipperiness of the floor surface.

In Test 4, the composition mixed and diluted in water was used to clean a concrete floor polished to 800 grit. On a dry concrete floor polished to 800 grit, the COF increased from 0.51 to 0.79 after application of the diluted composition to the floor surface. On a wet concrete floor polished to 800 grit, the COF increased from 0.62 to 0.66 after application of the diluted composition to the floor surface. Friction between the polished concrete floor surface and objects placed on that floor surface was increased resulting in a reduction in the slipperiness of the floor surface.

In Test 5, a concrete floor polished to 1,200 grit was cleaned with a mixture of the composition and water. On a dry concrete floor polished to 1,200 grit, the COF increased from 0.44 to 0.73 after application of the diluted composition to the floor surface. On a wet concrete floor polished to 1,200 grit, the COF increased from 0.52 to 0.59 after application of the diluted composition to the floor surface. Friction between the polished concrete floor surface and objects placed on that floor surface was increased resulting in a reduction in the slipperiness of the floor surface.

In all of the experiments conducted, as indicated in the results of Tests 1-5, application of the composition to a surface increased the coefficient of friction and reduced the slipperiness, and thus, the safety hazard of the floor surface.

In one embodiment, the composition may further includes an acrylate copolymer. The acrylate copolymer may be created from at least one alkyl acrylate and at least one monomer. The monomer of the acrylate copolymer can be selected from among one or more ionic monomers, maleic anhydride, or a mixture of at least one ionic monomer and maleic anhydride. The alkyl acrylate ester can include at least one monomer such as, for example, 2-methylbutyl acrylate, 4-methyl-2-pentyl acrylate, iso-octyl acrylate, and sec-butyl acrylate. In an exemplary embodiment, the composition may contain acrylate copolymer in an amount of 1 percent by weight. In other embodiments, the composition can include the acrylate copolymer in a range of about 0.9-1.1, about 0.8-1.2, about 0.75-1.25, about 0.5-3, about 0.4-2, or about 0.1-3 percent by weight.

The composition may be produced in any form such as, for example, a liquid, a liquid concentrate, a gel, an aerosol, or a paste. The composition is a neutral cleaner that can be used daily to wash hard surfaces and resilient floor coverings such as, for example, linoleum, stone, ceramic tile, composite tile, mineral tile, porcelain tile, vinyl tile, rubber vinyl, conductive vinyl, plastic, terrazzo, marble, concrete, sealed wood, and polished wood. The composition may be used to clean, polish, and protect floors and other surfaces in almost any area in which the user wishes to increase the coefficient of friction to reduce slip-and-fall accidents including but limited to homes, restaurants, kitchens, public restrooms, pool patios, interior walkways, and lobbies.

The invention further includes a method for preparing a cleaning composition. The composition can be used to increase friction between a first surface and a second surface and to clean the first surface. The method includes the steps of mixing the composition ingredients together while heating to produce a mixture, heating the mixture under vacuum pressure, and cooling the resulting composition. The composition can be created by mixing together for reaction in a reactor: a synthetic dimerized thermoplastic resin, a surfactant, tall oil distillate, (2-methoxymethylethoxy)-propanol, 2,2',2"-trihydroxy-triethylamine, and water. In an exemplary embodiment, the synthetic dimerized thermoplastic resin is pentaerythritol ester of maleic anhydride rosin and the surfactant is ethoxylated alkyl phenol. In an exemplary embodiment, the mixture is heated for 2.5 hours at a temperature of 235 degrees Celsius. In other embodiments of the method, the step can be performed over the course of about 2.3-2.7, about 2-3, about 1.5-5.5, about 1.45-6, or about 1.4-6.5 hours and the heat can be in a range of about 225-245, about 210-250, about 200-275, about 170-300, about 150-320, or about 140-335 degrees Celsius. In another embodiment, an acrylate copolymer may also be included in the mixture forming the composition.

Next, the mixture can be heated for about one hour at about 235 degrees Celsius under vacuum pressure. The pressure in the vacuum to which the mixture is subjected in this step is about 20 inches of mercury. In other embodiments of the method, the step can be performed over the course of about 0.5-2.5 hours, about 0.6-2.3, about 0.7-2, about 0.8-1.5, 0.9-1.1, and the heat can be in a range of about 225-245, about 210-250, about 200-275, about 170-300, about 150-320, or about 140-335 degrees Celsius. In other embodiments, the pressure in the vacuum to which the composition is subjected may be in a range of about 19.9-20.1, about 19.5-20.5, about 19-21, about 17.5-22.5, about 17-23, about 16-24, or about 15-25 inches of mercury.

Finally, the composition is cooled for packaging after which it is ready for use as a cleaning preparation on floors and other surfaces.

In another embodiment of the first and second steps of the method, the composition can be mixed together outside of a vacuum reactor. In this embodiment, the components of the composition can be mixed together in the following order with blending 5-10 minutes in between the addition of each component: water, a synthetic dimerized thermoplastic resin, (2-methoxymethylethoxy)-propanol, tall oil distillate, a surfactant, and 2,2',2"-trihydroxy-triethylamine. In an exemplary embodiment, sodium hydroxide can be added just before the synthetic dimerized thermoplastic resin is added to the mixture in order to stabilize the resin in solution. The sodium hydroxide can be 2.5 percent by weight of the composition. In other embodiments, the sodium hydroxide can be included in the composition in a range of about 2.4-2.6, about 2-3, about 3.5-4.5, about 2-3.5, or about 1-5 percent by weight. The mixture can be mixed until the resin is completely dissolved. During mixing, the mixture can also be heated to a temperature of 35-45 degrees Celsius to increase the rate of dissolution. In other embodiments, the mixture may be heated to a temperature in the range of about 38-42, about 34.9-45.1, about 34-46, about 31-47, about 28-48, about 22.5-49, or about 22-50 degrees Celsius.

In another method of the invention, the composition can be used to increase the slip resistance and coefficient of friction of a floor surface by applying diluted composition to a floor or other surface. In an exemplary embodiment, the composition can be prepared as a concentrate and thereafter diluted by mixing 3 ounces of concentrate per one gallon of water. In other embodiments of the method, the amount of composition mixed with one gallon of water may be in a range of about 2.9-3.1, about 2.7-3.3, about 2.5-3.5, about 2.2-3.8, about 2-4, about 1-5, about 0.75-5.5, or about 0.5-6 ounces. Once the composition is diluted from its original concentrated form, the composition may be applied to a floor or other surface using a cleaning tool such as, for example, a damp mop, automatic or mechanical scrubber, or any other suitable cleaning device. The diluted composition may be applied to a wet surface or to a dry surface. The floor or other surface can then be allowed to dry and does not require rinsing thereafter to remove the composition.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A composition for increasing friction between a first surface and a second surface and for cleaning the first surface, the composition comprising:
   a cleaning composition capable of forming a plurality of micelles that increase the friction between a first surface and a second surface and for cleaning the first surface, the plurality of micelles comprising:
     a synthetic dimerized thermoplastic resin, wherein the synthetic dimerized thermoplastic resin comprises pentaerythritol ester of maleic anhydride rosin;
     a surfactant;
     tall oil distillate;
     (2-methoxymethylethoxy)-propanol;
     2,2',2"-trihydroxy-triethylamine; and
     water.

2. The composition of claim 1, wherein the composition further comprises an acrylate copolymer.

3. The composition of claim 2, wherein the acrylate copolymer comprises:
   at least one alkyl acrylate ester; and
   at least one monomer selected from the group consisting of: at least one ionic monomer, maleic anhydride, and a mixture of at least one ionic monomer and maleic anhydride.

4. The composition of claim 3, wherein the at least one alkyl acrylate ester comprises at least one monomer selected from the group consisting of: 2-methylbutyl acrylate, 4-methyl-2-pentyl acrylate, iso-octyl acrylate, and sec-butyl acrylate.

5. The composition of claim 1, wherein the surfactant is ethoxylated alkyl phenol.

6. The composition of claim 1, wherein the composition comprises:
   synthetic dimerized thermoplastic resin in an amount of about 5-12 percent by weight;
   surfactant in an amount of about 1-6 percent by weight;
   tall oil distillate in an amount of about 1-8 percent by weight;
   (2-methoxymethylethoxy)-propanol in an amount of about 12-25 percent by weight;
   2,2',2"-trihydroxy-triethylamine in an amount of about 2-9 percent by weight; and
   water in an amount of about 50-75 percent by weight.

7. The composition of claim 6, wherein the composition further comprises acrylate copolymer in an amount of about 0.1-3 percent by weight.

8. The composition of claim 1, wherein the composition comprises a form selected from the group consisting of: a liquid, a liquid concentrate, a gel, an aerosol, and a paste.

9. The composition of claim 1, wherein the composition is a concentrate that is dilutable in water.

10. The composition of claim 9, wherein about 0.5-6 ounces of concentrate are mixed per one gallon of water.

* * * * *